(12) United States Patent
Wu et al.

US008592496B2

(10) Patent No.: US 8,592,496 B2
(45) Date of Patent: Nov. 26, 2013

(54) TELECHELIC HYBRID AEROGELS

(75) Inventors: Jung-Sheng Wu, Woodbury, MN (US);
Jayshree Seth, Woodbury, MN (US);
Michael D. Determan, Woodbury, MN (US); Peter D. Condo, Lake Elmo, MN (US); Lian Soon Tan, Woodbury, MN (US); Neeraj Sharma, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 139 days.

(21) Appl. No.: 13/133,419

(22) PCT Filed: Dec. 1, 2009

(86) PCT No.: PCT/US2009/066237
§ 371 (c)(1),
(2), (4) Date: Jun. 8, 2011

(87) PCT Pub. No.: WO2010/080238
PCT Pub. Date: Jul. 15, 2010

(65) Prior Publication Data
US 2011/0237692 A1    Sep. 29, 2011

Related U.S. Application Data

(60) Provisional application No. 61/138,577, filed on Dec. 18, 2008.

(51) Int. Cl.
*C01B 33/158* (2006.01)
(52) U.S. Cl.
USPC .............................. 521/64; 521/61
(58) Field of Classification Search
USPC .......................................... 521/64
See application file for complete search history.

(56) References Cited

U.S. PATENT DOCUMENTS

| | | |
|---|---|---|
| 3,122,520 A | 2/1964 | Lentz |
| 4,081,582 A | 3/1978 | Butterworth et al. |
| 4,609,581 A | 9/1986 | Ott |
| 4,629,652 A | 12/1986 | Carlson et al. |
| 4,770,917 A | 9/1988 | Tochacek et al. |
| 5,122,291 A | 6/1992 | Wolff et al. |
| 5,256,231 A | 10/1993 | Gorman et al. |
| 5,306,555 A | 4/1994 | Ramamurthi et al. |
| 5,470,802 A | 11/1995 | Gnade et al. |
| 5,505,769 A | 4/1996 | Dinnage et al. |
| 5,565,142 A | 10/1996 | Deshpande et al. |
| 5,789,075 A | 8/1998 | Frank et al. |
| 5,830,387 A | 11/1998 | Yokogawa et al. |
| 5,888,607 A | 3/1999 | Seth et al. |
| 5,904,703 A | 5/1999 | Gilson |
| 5,907,793 A | 5/1999 | Reams |
| 5,972,254 A | 10/1999 | Sander |
| 5,973,015 A | 10/1999 | Coronado et al. |
| 6,068,882 A | 5/2000 | Ryu |
| 6,087,407 A | 7/2000 | Coronado et al. |
| 6,159,539 A | 12/2000 | Schwertfeger et al. |
| 6,197,270 B1 | 3/2001 | Sonoda et al. |
| 6,294,194 B1 | 9/2001 | Horhota et al. |
| 6,316,092 B1 | 11/2001 | Frank et al. |
| 6,436,528 B1 | 8/2002 | Kulper et al. |
| 6,451,146 B1 | 9/2002 | Ganschow et al. |
| 6,470,597 B1 | 10/2002 | Stipp |
| 6,479,416 B1 | 11/2002 | Frank et al. |
| 6,537,935 B1 | 3/2003 | Seth et al. |
| 6,670,402 B1 | 12/2003 | Lee et al. |
| 6,713,584 B1 | 3/2004 | Chisholm et al. |
| 6,729,042 B2 | 5/2004 | Lee |
| 6,989,123 B2 | 1/2006 | Lee et al. |
| 7,078,359 B2 | 7/2006 | Stepanian et al. |
| 7,244,796 B2 | 7/2007 | Chisholm et al. |
| 2001/0024692 A1 | 9/2001 | Aronson |
| 2004/0132846 A1* | 7/2004 | Leventis et al. ............. 521/99 |
| 2004/0142149 A1 | 7/2004 | Mollendorf et al. |
| 2005/0192366 A1* | 9/2005 | Ou et al. ..................... 521/64 |
| 2005/0192367 A1 | 9/2005 | Ou et al. |
| 2006/0024133 A1 | 2/2006 | Shiomoto et al. |
| 2006/0178496 A1 | 8/2006 | Lin et al. |
| 2006/0269734 A1 | 11/2006 | Krajewski et al. |
| 2006/0286360 A1 | 12/2006 | Rhine et al. |

FOREIGN PATENT DOCUMENTS

| | | |
|---|---|---|
| DE | 10113425 | 10/2002 |
| EP | 0341993 B1 | 8/1993 |
| EP | 0995782 | 10/1999 |
| JP | 3-213545 | 1/1990 |
| WO | WO 2006/107226 | 10/2006 |
| WO | WO 2006/126232 | 11/2006 |
| WO | WO 2006/135882 | 12/2006 |
| WO | WO 2007/011988 A2 | 1/2007 |

OTHER PUBLICATIONS

Rubinstein, M.; Colby, R.H. "Random Branching and Gelation" in "Polymer Physics". Oxford University Press 2003. pp. 198-199.*
Rao, A.; Rao, A.; Pajonk, G. "Hydrophobic and physical properties of the ambient pressure dried silica aerogels with sodium silicate precursor using various surface modification agents". Applied Surface Science 253 (2007) 6032-6040. Available online Jan. 7, 2007.*
Bhagat et al., "Rapid synthesis of water-glass based aerogels by in situ surface modification of the hydrogels," Applied Surface Science 253 (2007) pp. 3231-3236.
Bhagat et al., "Methyltrimethoxysilane based monolithic silica aerogels via ambient pressure drying," Microporous and Mesoporous Materials 100 (2007) pp. 350-355.
Fidalgo et al., "Hybrid Silica/Polymer Aerogels Dried at Ambient Pressure," Chem. Mater. 2007, 19, pp. 2603-2609.

(Continued)

*Primary Examiner* — Randy Gulakowski
*Assistant Examiner* — Christina Wales
(74) *Attorney, Agent, or Firm* — C. Michael Geise

(57) ABSTRACT

Methods of forming hybrid aerogels are described. The methods include forming a hybrid aerogel from a metal oxide precursor and a branched telechelic copolymer, e.g., co-hydrolyzing and co-condensing the metal oxide precursor and the branched telechelic copolymer. Aerogels and aerogel articles, including hydrophobic aerogels and hydrophobic aerogel articles are also described.

15 Claims, 1 Drawing Sheet

(56) References Cited

OTHER PUBLICATIONS

Gomez-Romero, Pedro et al., Functional Hybrid Materials (6$^{th}$ Edition), p. 96, Wiley-VCH (2004).
Hench et al., "Gel-Silica Science," Annu. Rev. Mater. Sci. 20 (1990) pp. 269-298.
Ilharco et al., "Nanostructured silica/polymer subcritical aerogels," J. Mater. Chem. 17, 2007, pp. 2195-2198.
Kistler, "Coherent Expanded Aerogels," Journal of Physical Chemistry. (1932) 36(1), pp. 52-64.
Leventis et al., "Nanoengineering Strong Silica Aerogels," (2002) Nano Letters, vol. 2, No. 9, pp. 957-960.
Lewis, Richard J., Sr. (2002). Hawley's Condensed Chemical Dictionary (14$^{th}$ Edition) John Wiley & Sons. Online version available at: http://knovel.com/web/portal/browse/display?_EXT_KNOVEL_DISPLAY_bookid=704&VerticalID=0Properties of Nylon, Accessed, Aug. 13, 2009.
Lewis, Richard J., Sr. (2002). Hawley's Condensed Chemical Dictionary (14$^{th}$ Edition) John Wiley & Sons. Online version available at: http://knovel.com/web/portal/browse/display? EXT_KNOVEL_DISPLAY_bookid=704&VerticalID=0Properties of Polypropylene, Accessed Aug. 13, 2009.
Lewis, Richard J., Sr. (2002). Hawley's Condensed Chemical Dictionary (14$^{th}$ Edition) John Wiley & Sons. Online version available at: http://knovel.com/web/portal/browse/display? EXT_KNOVEL_DISPLAY_bookid=704&VerticalID=0Properties of Polyethylene, Accessed Aug. 13, 2009.
Martin et al., "Organo-modified silica aerogels and implications for material hydrophobicity and mechanical properties," J. Mater. Chem., 2008, 18, pp. 207-213.
Rao et al., "Organic Surface Modification of TEOS Based Silica Aerogels Synthesized by Co-Precursor and Derivitization Methods," Journal of Sol-Gel Science and Technology 30, 2004, pp. 141-147.
Rosa-Fox et al., "Nanoindentation on hybrid organic/inorganic silica aerogels," Journal of the European Ceramic Society 27 (2007) pp. 3311-3316.
Slark et al., "Branched methacrylate copolymers from multifunctional comonomers: the effect of multifunctional monomer functionality on polymer architecture and properties," J. Mater. Chem., 2003, 13, pp. 2711-2720.
Teegarden, David M., Polymer Chemistry: Introduction to an Indispensible Science, (2004) NSTA Press pp. 149-150.
Yokogawa et al., "Hydrophobic silica aerogels," Journal of Non-Crystalline Solids 186 (1995) pp. 23-29.
Bhagat et al., "Surface chemical modification of TEOS based silica aerogels synthesized by two step (acid base) sol-gel process", Applied Surface Science, vol. 252, No. 12 (2006) pp. 4289-4297.
Bhagat et al., "Textural properties of ambient pressure dried water-glass based silica aerogel beads: One day synthesis", Science Direct, Microporous and Mesoporous Materials, vol. 96, No. 1-3, Nov. 26, 2006, pp. 237-244.
Buisson et al., "Immobilization in quartz fiber felt reinforced silica aerogel improves the activity of Candida rugosa lipase in organic solvents", Journal of Molecular Catalyst: B Enzymatic, 39 (2006) pp. 77-82.
Dorcheh, A. Solemani, et al., "Silica aerogels; synthesis, properties and characterization", Journal of Materials Processing Technology, vol. 199, 2007, pp. 10-26.
Hegde, Nagaraja D. et al., "Organic modification of TEOS based silica aerogels using hexadecyltrimethoxysilane as a hydrophobic reagent", Applied Surface Science, vol. 253 (2006) pp. 1566-1572.
Meador, Mary Ann B. et al., "Cross-linking Amine-Modified Silica Aerogels with Epoxies: Mechanically Strong Lightweight Porous Materials", Chemistry of Materials, vol. 17, No. 5, Mar. 1, 2005, pp. 1085-1098.
Rao et al, "Comparative studies on the surface chemical modification of silica aerogels based on various organosilane compounds of the type RnSiX4-n", Journal of Non-Crystalline Solids, 350 (Dec. 15, 2004) pp. 216-233.
Rao et al., Effect of precursors, methylation agents and solvents on the physicochemical properties of silica aerogels prepared by atmospheric pressure drying method, Journal of Non-Crystalline Solids, 296 (2001) pp. 165-171.
Rao et al., "Surface chemical modification of silica aerogels using various alky-alkoxy/chloro silanes", Applied Surface Science, vol. 206 (2003) pp. 262-270.
Rao et al., "Synthesis of flexible silica aerogels using methyltrimethoxysilane (MTMS) precursor", Journal of Colloid and Interface Science, vol. 300 (2006) pp. 279-285.
Rao et al., "Comparative studies of the physical and hydrophobic properties of TEOS based silica aerogels using different co-precursors", Science and Technology of Advanced Materials, vol. 4, No. 6, Nov. 30, 2003, pp. 509-515.
Zhang, Xin et al., "Structural characterization of sol-gel composites using TEOS/MEMO as precursors", Surface and Coatings Technology, vol. 201, No. 12, Feb. 2, 2007, pp. 6051-6058.

* cited by examiner

TELECHELIC HYBRID AEROGELS

CROSS REFERENCE TO RELATED APPLICATIONS

This application is a national stage filing under 35 U.S.C. 371 of PCT/US2009/066237, filed Dec. 1, 2009, which claims priority to U.S. Provisional Application No. 61/138,577, filed Dec. 18, 2008, the disclosures of which are incorporated by reference in their entirety herein.

FIELD

The present disclosure relates to inorganic-organic hybrid aerogels and methods of making such aerogels. In particular, the inorganic-organic hybrid aerogels of the present disclosure include branched telechelic (co)polymers with reactive end-groups.

BACKGROUND

Aerogels are a unique class of ultra-low-density, highly porous materials. The high porosity, intrinsic pore structure, and low density make aerogels extremely valuable materials for a variety of applications including insulation. Low density aerogels based upon silica are excellent insulators as the very small convoluted pores minimize conduction and convection. In addition, infrared radiation (IR) suppressing dopants may easily be dispersed throughout the aerogel matrix to reduce radiative heat transfer.

Escalating energy costs and urbanization have lead to increased efforts in exploring more effective thermal and acoustic insulation materials for pipelines, automobiles, aerospace, military, apparel, windows, houses as well as other appliances and equipment. Silica aerogels also have high visible light transmittance so they are also applicable for heat insulators for solar collector panels.

SUMMARY

Briefly, in one aspect, the present disclosure provides methods of preparing hybrid aerogels comprising forming an aerogel precursor from a sol comprising a solvent, a metal oxide precursor, and a branched telechelic copolymer; and drying the aerogel precursor to form the hybrid aerogel. In some embodiments, the metal oxide precursor and the branched telechelic polymer are co-hydrolyzed and co-condensed.

In some embodiments, the solvent comprises at least one of water and an alkyl alcohol. In some embodiments, the aerogel precursor is solvent-exchanged with an alkyl alcohol to form an alcogel. In some embodiments, the aerogel precursor or the alcogel is supercritically dried to form the hybrid aerogel.

In some embodiments, the metal oxide precursor comprises an organosilane, e.g., a tetraalkoxysilane. In some embodiments, the metal oxide precursor comprises a prepolymerized silicon alkoxide, optionally wherein the prepolymerized silicon alkoxide comprises a polysilicate.

In some embodiments, the sol comprises at least 0.5% by weight of the branched telechelic polymer based on the total weight of the metal oxide precursor and the branched telechelic copolymer. In some embodiments, the sol comprises no greater than 25% by weight of the branched telechelic polymer based on the total weight of the metal oxide precursor and the branched telechelic copolymer.

In some embodiments, the branched telechelic polymer comprises hydrolyzable functional groups. In some embodiments, the branched telechelic polymer is the polymerization product of a combination of monomers comprising one or more (meth)acrylate monomers, e.g., butyl acrylate. In some embodiments, the metal oxide of the aerogel precursor is covalently bonded to the branched telechelic polymer.

In some embodiments, the sol comprises a hydrophobic surface modifying agent. In some embodiments, the sol comprises an acid.

In some embodiments, the sol is applied to a substrate (e.g., a non-woven substrate bonded web) prior to forming the aerogel, e.g., prior to forming the aerogel precursor. In some embodiments, In another aspect, the present disclosure provides hybrid aerogels and hybrid aerogel article made according to the methods of the present disclosure. In some embodiments, the hybrid aerogels comprise an inorganic portion comprising a metal oxide and an organic portion comprising a branched telechelic polymer. In some embodiments, the hybrid aerogel is hydrophobic.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
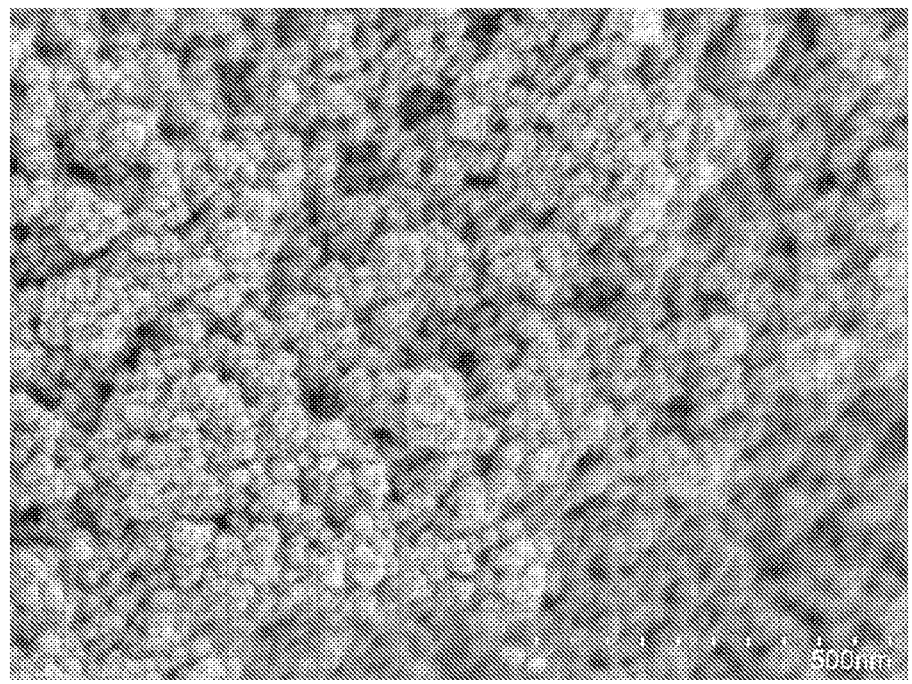
FIG. 1 is an SEM image of the inorganic aerosol of Example CE-2 (100% TEOS).

Due in part to their low density inorganic structure (often >90% air), aerogels have certain mechanical limitations. For example, inorganic aerogels have a high stiffness and tend to be brittle. Previous attempts have been made to improve the mechanical properties of inorganic aerogels by introducing organic content via long and short chained linear and branched polymers and oligomers to form organic/inorganic hybrid aerogels. However these approaches have significant limitations such as insufficient or inefficient reinforcement, reinforcement at the cost of other desirable properties, laborious processes for making the reinforcing organics, and costly routes for commercial scale production.

The present disclosure provides alternative hybrid aerogels wherein the inorganic network is strengthened by organic branched telechelic polymers (BTP). Telechelic polymers are defined as macromolecules that contain reactive end-groups, i.e., end-groups that react to give a bond with another molecule. Telechelic polymers may be, e.g., linear polymers having functional groups on both ends. Branched telechelic polymers are branched polymers with functional groups on a plurality of branch ends. Generally, branched polymers exhibit lower viscosities relative to linear polymers of analogous molecular weight, due to a decrease in chain entanglement.

In some embodiments, the addition of branched telechelic polymers results in toughening of the material and improved mechanical properties of hybrid aerogel, e.g., decreased brittleness and improved compressive modulus. Although not wishing to be bound by any theory, it is believed that the inclusion of a branched telechelic polymer introduces 'soft' domains into the morphology of the otherwise brittle inorganic aerogel. It is also believed that the polymer domains can act as a modifier of the impact strength by absorbing stresses generated in the network.

The methods and resulting aerogels of the present invention are not particularly limited to specific metal oxide precursors. In some embodiments, the metal oxide precursor comprises an organosilane, e.g., a tetraalkoxysilane. Exemplary tetraalkoxysilanes include tetraethoxysilane (TEOS) and tetramethoxysilane (TMOS). In some embodiments, the organosilane comprises an alkyl-substituted alkoxysilane, e.g., methyltrimethoxysilane (MTMOS). In some embodiments, the organosilane comprises a pre-polymerized silicon alkoxide, e.g., a polysilicate such as ethyl polysilicate.

In some embodiments, inorganic aerogels (e.g., those comprised of silica) are reinforced with branched telechelic polymers having terminal functional groups that are capable of covalently reacting with the inorganic aerogel network. For example, in some embodiments, hybrid aerogel materials are based on inorganic compounds having embedded organic domains that are covalently reacted with the inorganic phase. In some embodiments, hybrid aerogel materials are based on inorganic compounds with nanometer-scale organic domains comprised of highly branched and highly functional telechelic polymers.

In some embodiments, the BTPs are the polymerization product of monofunctional monomer (MFM), a polyfunctional monomer (PFM), and a chain transfer agent (CTA). For example, in some embodiments, the BTPs can be based on (meth)acrylate chemistry and may be prepared via free radical polymerization. For example, in some embodiments, the BTP can be the polymerization product of a combination of monomers comprising one or more (meth)acrylate monomers including, e.g., C1 to C50, (e.g., C4 to C20) (meth)acrylates (e.g., methyl acrylate, butyl acrylate, isooctyl acrylate, octadecyl acrylate, and the like). In some embodiments, a free radical generating species (initiator) may be used. Generally, the terminal functional groups, the degree of branching, the molecular weight, and the chemistry of the backbone polymer of the BTP can be independently selected to tailor material properties.

In some embodiments, a BTP may have a plurality of hydrolyzable terminal functional groups. In some embodiments, an aerogel precursor may comprise a BTP having terminal functional groups; and an inorganic precursor having functional groups reactive with the terminal functional groups of the BTP.

Generally, the methods of the present disclosure begin with a sol comprising a solvent a metal oxide precursor, and a branched telechelic polymer. In some embodiments, the sol comprises at least 0.2% by weight of a branched telechelic polymer based on the total weight of the metal oxide precursor and the branched telechelic polymer. In some embodiments, the sol comprises at least 0.5%, or even at least 1% of the BTP based on the total weight of the metal oxide precursor and the BTP. In some embodiments, the sol comprises no greater than 30%, e.g., no greater than 25% or even no greater than 20% by weight of the BTP based on the total weight of the metal oxide precursor and the BTP. For example, in some embodiments, the sol comprises 0.5 to 25% by weight, e.g., between 1 and 20%, or even between 5 and 20% by weight of the BTP based on the total weight of the metal oxide precursor and the BTP.

In some embodiments, the solvent comprises water. In some embodiments, one or more organic solvents such as an alkyl alcohol may be used. In some embodiments, the sol may include both water and one or more organic solvents, e.g., a water/alkyl alcohol blend. In some embodiments, the sol comprises at least two moles of water per mole of metal oxide precursor. In some embodiments, the sol comprises 2 to 5, e.g., 3 to 4, moles of water per mole of metal oxide precursor.

Following gel formation, the solvent is removed, drying the aerogel precursor to form an aerogel. Generally, any known gel drying technique may be used. In some embodiments, the gel may be supercritically dried using, e.g., supercritical carbon dioxide. After solvent removal, the resulting material is typically referred to as an aerogel.

In some embodiments, a solvent exchange step may precede the drying step. For example, it may be desirable to replace water present in the initial sol with other organic solvents. Generally, any known method of solvent exchange may be used with the methods of the present disclosure. Generally, it may be desirable to replace as much water as possible with the alternate organic solvent. However, as is commonly understood, it may be difficult, impractical, or even impossible to remove all water from the gel. In some embodiments, the exchange solvent may be an alkyl alcohol, e.g., ethyl alcohol. After solvent exchange with an organic solvent, the resulting gel is often referred to as an organogel as opposed to a hydrogel, which refers to gel wherein the solvent is primarily water. When the exchange solvent is an alkyl alcohol, the resulting gel is often referred to as an alcogel.

In some embodiments, the aerogel is hydrophobic. A typical method for making aerogels hydrophobic involves first making a gel. Subsequently, this preformed gel is soaked in a bath containing a mixture of solvent and the desired hydrophobizing agent in a process often referred to as surface derivatization. For example, U.S. Pat. No. 5,830,387 (Yokogawa et al.) describes a process whereby a gel having the skeleton structure of $(SiO_2)_n$ was obtained by hydrolyzing and condensing an alkoxysilane. This gel was subsequently hydrophobized by soaking it in a solution of a hydrophobizing agent dissolved in solvent. Similarly, U.S. Pat. No. 6,197,270 (Sonada et al.) describes a process of preparing a gel having the skeleton structure of $(SiO_2)_m$ from a water glass solution, and subsequently reacting the gel with a hydrophobizing agent in a dispersion medium (e.g., a solvent or a supercritical fluid).

In some embodiments, hydrophobic aerogels can be prepared from sols containing a hydrophobic surface modifying agent. Such methods are described in co-filed U.S. Application Ser. No. 61/138,562.

Generally, during the gel formation process, the hydrophobic surface modifying agent combines with the skeletal structure formed by the metal oxide precursor to provide a hydrophobic surface. In some embodiments, the hydrophobic surface modifying agent is covalently bonded to the metal oxide skeleton. In some embodiments, the hydrophobic surface modifying agent may be ionically bonded to the metal oxide skeleton. In some embodiments, the hydrophobic surface modifying agent may be physically adsorbed to the metal oxide skeleton.

Generally, the hydrophobic surface modifying agent comprises two functional elements. The first element reacts with (e.g., covalently or ionically) or absorbs on to the metal oxide skeleton. The second element is hydrophobic. Exemplary hydrophobic surface modifying agents include organosilane, organotin, and organophosphorus compounds. One exemplary organosilane is 1,1,1,3,3,3-hexamethyldisilazane (HMDZ).

In some embodiments, the sol further comprises an acid. In some embodiments, the acid is an inorganic acid, e.g., hydrochloric acid. In some embodiments, the acid may be an organic acid, e.g., oxalic acid. In some embodiments, the sol comprises between 0.0005 and 0.0010 moles of acid per mole of metal oxide precursor. In some embodiments, comprises between 0.0006 and 0.0008 moles of acid per mole of metal oxide precursor.

In addition to forming hybrid aerogels, the methods of the present disclosure may be used to form aerogel articles, e.g., flexible aerogel articles. For example, in some embodiments, the sol may be applied to a substrate prior to forming a gel. Gelation, solvent exchange (if used), and drying may then occur on the substrate.

In some embodiments, the substrate may be porous, e.g., a woven or nonwoven fabric. Exemplary substrates also include bonded web such as those described in U.S. patent application Ser. No. 11/781,635, filed Jul. 23, 2007.

EXAMPLES

The following materials were used to produce exemplary hybrid aerogels according to some embodiments of the present disclosure.

TABLE 1

Summary of raw materials.

| Material | Description | Source |
|---|---|---|
| BA | n-butyl acrylate (>99.5%) | Fluka |
| AIBN | 2,2'-azobis(2-methylbutyronitrile) (>98%) | Fluka |
| THF | tetrahydrofuran (>99.7%) | Alpha Aeser |
| 3MPTMS | 3-mercaptopropyl trimethoxysilane (>97%) | Fluka |
| HDDA | hexane diol diacrylate (80%) | Sigma Aldrich |
| VAZPIA | vinylazlactone photoinitiator (>99%) | 3M |
| TEOS | tetraethoxysilane (>99%) | Alpha Aeser |
| HMDZ | 1,1,1,3,3,3-hexamethyldisilazane (>99%) | Alpha Aeser |
| EtOH | ethyl alcohol (200 proof) | AAPER Alcohol and Chemical Co. |
| TMPTA | trimethylolpropane | BASF |
| HCl | hydrochloric acid (1N) | EMD Chemical Inc. |
| NH4OH | ammonia solution (32%, extra pure) | EMD Chemical Inc. |

The following test methods were used to characterize the aerogels.

Brunauer, Emmett, and Teller (BET). BET analysis was conducted using an AUTOSORB-1 model AS1 MP-LP instrument and associated software (AS1Win version 1.53) available from Quantachrome Instruments (Boynton Beach, Fla.). Sample material was placed in a 9 mm sample tube with a uniform initial weight of approximately 0.0475 grams. The sample was degassed for at least 24 hours at 80° C. prior to analysis. Nitrogen was used as the analyte gas. The BJH method was applied to desorption data to determine pore volume and diameter.

Bulk Density. To enable measurement of bulk density, aerogel cylinders were synthesized within plastic syringes with one end cut off. Once gelled, the aerogel cylinder was extracted from the syringe using the syringe plunger and dried. The diameter and length of the dried cylinders were measured and the volume calculated. The weight of the samples was measured on an analytical balance. The bulk density was then calculated from the ratio of weight to volume.

Skeletal Density. The skeletal density was determined using a Micromeritics ACCUPYC 1330 helium gas pycnometer. The instrument uses Boyle's law of partial pressures in its operation. The instrument contains a calibrated volume cell internal to the instrument. The sample was placed in a sample cup, weighed and inserted into the instrument. The sample was pressurized in the instrument to a known initial pressure. The pressure was bypassed into the calibrated cell of the instrument and a second pressure recorded. Using the initial pressure, the second pressure, and the volume of the calibrated cell, the skeletal volume of the sample was determined. The skeletal density was then determined from the skeletal volume and the sample weight.

Porosity. The percent porosity was calculated from the measured bulk density ($\rho_{bulk}$) and the and skeletal density ($\rho_{skeletal}$) using the following formula:

$$\text{porosity (\%)} = \left(1 - \left(\frac{\rho_{bulk}}{\rho_{skeletal}}\right)\right) \times 100$$

Proton Nuclear Magnetic Resonance (H1 NMR). Samples were dissolved in deuterochloroform (Sigma-Aldrich, 99.6%) at 10 mg/ml and analyzed with a Varian INOVA 400 MHz NMR instrument.

Gel Permeation Chromatography (GPC). Samples were dissolved in THF at 1 mg/ml and filtered through a 0.45 micron syringe filter prior to analysis. The GPC system consisted of a WATERS 1515 pump, 717PLUS AUTOSAMPLER, 2 PL gel 5 micron MIXED-D 300×7.5 mm columns and a WATERS 2410 refractive index detector. Relative molecular weight analyses of the samples were carried out with WATERS BREEZE software using a calibration based on linear, low PDI polystyrene standards from Polymer Laboratories.

Particle size distribution. Particle size distribution was measured with dynamic light scattering (DLS) using a Malvern Instruments ZETASIZER Nano ZS instrument. Samples were prepared as for the GPC analysis using quartz cuvettes for analysis. Malvern ZETASIZER software was used to analyze the data. Average particle diameter is the harmonic intensity-averaged particle diameter, and was determined by equation (C.10) of annex C of ISO 13321, Particle size analysis-Photon correlation spectroscopy. Polydispersity index is a dimensionless measure of the broadness of the size distribution, and was determined by equation (C.9) of annex C of ISO 13321.

Scanning Electron Microscopy (SEM). SEM images were obtained using a Hitachi S4800 field emission scanning electron microscope. Samples were attached to an SEM stub and sputter coated with platinum. Imaging conditions: 0.8, 1.5 mm wd; mixed detector; slow capture mode; tilt=0°; magnifications shown on the images.

Hydrophobicity. A small sample was placed in a jar containing deionized water at room temperature (22+/−2° C.). If the samples remained floating after 30 minutes, it was judged to be hydrophobic. If the sample was not floating after 30 minutes, it was judged to be non-hydrophobic.

Three branched telechelic polymers were prepared as follows. The branched telechelic polymers BTP-A and BTP-B were prepared using a thermal initiator and the resulting dispersions contained about 40% (w/w) solids. Branched telechelic polymer BTP-C was prepared using a photoinitiator and the resulting dispersion contained about 67% (w/w) solids.

Synthesis and Characterization of Branched Telechelic Polymer BTP-A.

In a 250 ml glass bottle were added 100 grams of BA, 1.5 grams of AIBN, 160 grams of THF, 1.532 grams of 3 MPTMS, and 1.678 grams of HDDA. The contents of the bottle were deoxygenated by purging with nitrogen at a flow rate of 1 liter per minute for 15 minutes. The bottle was then sealed and placed in a rotating water bath at 60° C. for 24 hours. Aliquots of the resulting branched telechelic polymer were removed, precipitated in methanol, and dried in vacuum to remove residual reactants from the polymerization product.

The overall conversion of monomers was 97.6%, as determined gravimetrically. Incorporation of the 3 MPTMS was 0.8 parts by weight per 100 parts of n-butyl acrylate, as determined by H1 NMR. GPC was used to characterize the molecular weight. The number average molecular weight (Mn) was 7,100 g/mol; the weight average molecular weight (Mw) was 21,300 g/mol; the z-average molecular weight (Mz) was 48,000 g/mol; and the polydispersity index (Mw/Mn) was 3.0. DLS was used to characterize the particle size. The average particle diameter was 9.9 nm and the polydispersity index was 0.25.

Synthesis and Characterization of Branched Telechelic Polymer BTP-B.

In a 250 ml glass bottle were added 100 grams of BA, 1.5 grams of AIBN, 160 grams of THF, 1.532 grams of 3 MPTMS, and 1.678 grams of HDDA. The contents of the bottle were deoxygenated by purging with nitrogen at a flow rate of 1 liter per minute for 15 minutes. The bottle was then sealed and placed in a rotating water bath at 60° C. for 24 hours. Aliquots of the resulting branched telechelic polymer were removed, precipitated in methanol, and dried in vacuum to remove residual reactants from the polymerization product.

The overall conversion of monomers was 91.2%. Incorporation of the 3 MPTMS was 8.4 parts by weight per 100 parts of n-butyl acrylate. The measured molecular weights were: Mn=3,000 g/mol; Mw=45,600 g/mol; Mz=208,000 g/mol; and polydispersity index=15.1. The average particle diameter was 25.3 nm, with a polydispersity index of 0.38.

Synthesis of Branched Telechelic Polymer BTP-C

In a 250 ml glass bottle were added 50 grams of BA, 14.17 grams of VAZPIA, 40 grams of THF, and 7.246 grams of 3 MPTMS. The bottle containing the reactants was purged with nitrogen to remove oxygen, sealed, and exposed to UV radiation for 2 hours to form the branched telechelic polymer.

Aerogel Preparation Procedure

The following procedure exemplifies the process used to make gel precursors, particularly a gel precursor based on TEOS with 3% wt. of a branched telechelic polymer. First, 5.052 grams of TEOS were mixed with 0.390 grams of the desired BTP solution (40% wt. in THF), 5.174 grams of THF, 2.304 grams of EtOH, and 1.35 grams of deionized water in a container resulting in a molar ratio of TEOS:THF:ethanol:water of 1:3:2:3. Next, 0.0175 ml of 1N HCl (0.0007 moles of HCl per mole TEOS) was added to the solution, which was then mixed for two hours at 50° C. The resulting reaction sol was cooled for 15 minutes by partially immersing the container in a mixture of EtOH and dry ice. The sol was then gelled by adding 0.85 grams of 0.05 N NH4OH solution (molar ratio of TEOS:NH4OH=1:0.0017). The mixture was poured into containers with desired shapes and allowed to gel. The resulting alcohol-gel was removed from the gelation container and placed in a container of ethanol where it was aged at 60° C. for two days. The aged gel was solvent exchanged several times with EtOH to remove residual water. Finally, the resulting gel was dried with supercritical carbon dioxide as follows.

Supercritical Fluid Drying. The sample was weighed and placed in a permeable cloth bag sealed with a draw string and placed inside a stainless steel chamber fitted with metal frits and O-rings. This chamber was inserted into a vessel rated to handle high pressure (40 MPa (6000 psig)). The outside of this vessel was heated by a jacket. Carbon dioxide was chilled to less than minus 10 degrees Celsius and pumped with a piston pump at a nominal flow rate of one liter per minute through the bottom of the unit. After ten minutes, the temperature of the unit was raised to 40° C. at a pressure of 10.3 MPa (1500 psig). The carbon dioxide was supercritical at these conditions. Drying was conducted for a minimum of seven hours, after which the carbon dioxide flow was ceased and the pressure was slowly decreased by venting the carbon dioxide. When the pressure was at 370 kPa (40 psig) or lower, the supercritically-dried samples were removed and weighed.

Comparative Example 1 and Examples 1-4

TEOS/BTP-A Aerogels

Hybridized and unhybridized silica aerogels were synthesized using the Aerogel Preparation Procedure. Specific compositions of these samples are shown in Table 2. Table 3 shows that the hybrid aerogels with varying amounts of organics in the form of branched telechelic (co)polymers (Examples 1-4) possess high surface area, high pore volume, low bulk density, and high porosity comparable to the pure TEOS aerogel (Comparative Example 1).

TABLE 2

Formulation of TEOS/BTP-A aerogels.

| | Relative wt. % | | Moles per mole of TEOS | | | | |
|---|---|---|---|---|---|---|---|
| Ex. | TEOS | BTP-A | $H_2O$ | THF | EtOH | HCl | $NH_4OH$ |
| CE-1 | 100 | 0 | 3.0 | 3.0 | 2.0 | 0.0007 | 0.0017 |
| 1 | 99.5 | 0.5 | 3.0 | 3.0 | 2.0 | 0.0007 | 0.0017 |
| 2 | 99 | 1 | 3.0 | 3.0 | 2.0 | 0.0008 | 0.0017 |
| 3 | 97 | 3 | 3.0 | 2.9 | 2.0 | 0.0008 | 0.0017 |
| 4 | 95 | 5 | 3.0 | 2.8 | 2.0 | 0.0009 | 0.0017 |

TABLE 3

Characteristics of TEOS/BTP-A aerogels.

| Ex. | surface area ($m^2/g$) | pore volume (cc/g) | bulk density (g/cc) | skeletal density (g/cc) | porosity (%) | hydrophobic |
|---|---|---|---|---|---|---|
| CE-1 | 1041 | 2.8 | 0.332 | 1.71 | 81 | No |
| 1 | 1101 | 3.8 | 0.286 | 1.68 | 83 | No |
| 2 | 1054 | 3.5 | 0.277 | 1.64 | 83 | No |
| 3 | 991 | 2.8 | 0.255 | 1.66 | 85 | No |
| 4 | 968 | 2.7 | 0.302 | 1.62 | 81 | No |

Comparative Example 2 and Examples 5-8

TEOS/BTP-A (Aerogels Surface Treated Prior to Gelation)

Hybridized and unhybridized silica aerogels were synthesized using the Aerogel Preparation Procedure, except that the sol was gelled by adding 1.33 grams of HMDZ (mole ratio of TEOS:HMDZ=1:0.33) rather than the 0.05 N NH4OH solution in order to provide hydrophobic aerogels.

TABLE 4

Formulation of TEOS/BTP-A aerogels with a hydrophobic surface treatment.

| | Relative wt. % | | Moles per mole of TEOS | | | | |
|---|---|---|---|---|---|---|---|
| Ex. | TEOS | BTP-A | H$_2$O | THF | EtOH | HCl | HMDZ |
| CE-2 | 100 | 0 | 3.0 | 2.0 | 2.0 | 0.0008 | 0.33 |
| 5 | 99.5 | 0.5 | 3.0 | 3.0 | 2.0 | 0.0007 | 0.33 |
| 6 | 99 | 1 | 3.0 | 3.0 | 2.0 | 0.0007 | 0.33 |
| 7 | 97 | 3 | 3.0 | 3.0 | 2.0 | 0.0007 | 0.33 |
| 8 | 97 | 3 | 3.0 | 3.0 | 2.0 | 0.0007 | 0.33 |
| 9 | 95 | 5 | 3.0 | 3.0 | 2.0 | 0.0009 | 0.33 |
| 10 | 95 | 5 | 3.0 | 3.0 | 2.0 | 0.0009 | 0.33 |
| 11 | 90 | 10 | 3.0 | 2.6 | 2.0 | 0.0007 | 0.33 |

As summarized in Table 5, these samples possess the characteristic properties of aerogels such as high surface area, high pore volume, low bulk density and high porosity. In addition, the Surface Treatment Process rendered the aerogels hydrophobic as determined by the Hydrophobicity test.

TABLE 5

Characteristics of TEOS/BTP-A aerogels with a surface treatment.

| Ex. | surface area (m$^2$/g) | pore volume (cc/g) | bulk density (g/cc) | skeletal density (g/cc) | porosity (%) | hydrophobic |
|---|---|---|---|---|---|---|
| CE-2 | 792 | 1.7 | 0.317 | 1.64 | 81 | Yes |
| 5 | 857 | 2.5 | 0.248 | 1.64 | 85 | Yes |
| 6 | 493 | 2.1 | 0.262 | 1.63 | 84 | Yes |
| 7 | 455 | 1.5 | 0.294 | 1.58 | 73 | Yes |
| 8 | 480 | 1.9 | 0.378 | 1.57 | 76 | Yes |
| 9 | 705 | 2.2 | 0.308 | 1.58 | 81 | Yes |
| 10 | 455 | 1.5 | 0.401 | 1.50 | 73 | Yes |
| 11 | 461 | 1.0 | 0.440 | 1.52 | 76 | Yes |

Figure 2:
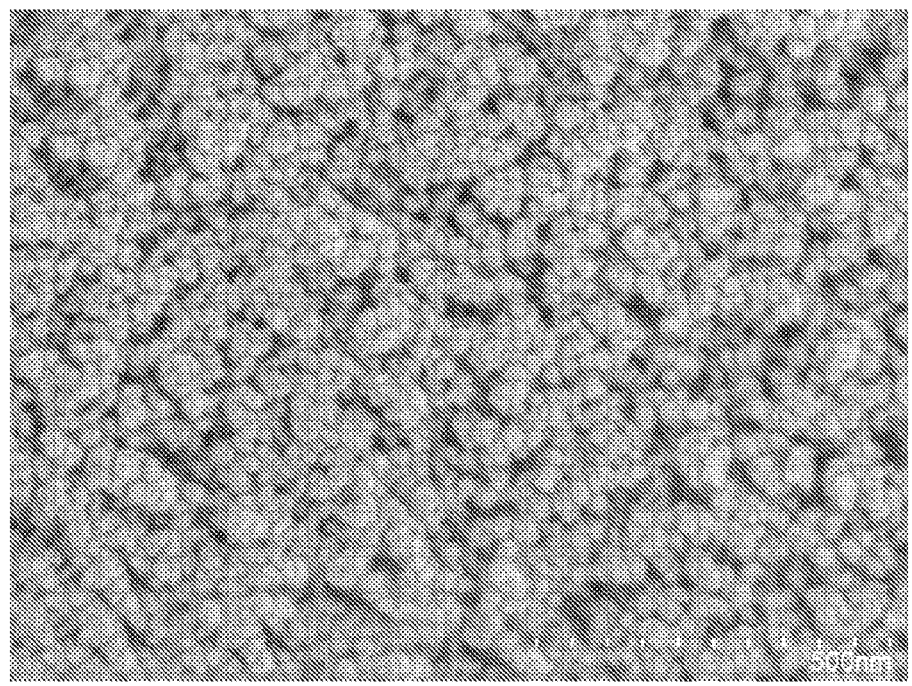
FIG. 2 is an SEM image of the inorganic/organic hybrid aerogel of Example 10 (5% BTP-A, 95% TEOS (w/w)).

FIG. 1 is an SEM image of the inorganic aerogel of Example CE-2 (100% TEOS). FIG. 2 is an SEM image of the inorganic/organic hybrid aerogel of Example 10 (5% BTP-A, 95% TEOS (w/w)). As shown, the addition of the branched telechelic copolymer did not affect the clustering of primary particles forming the mesopore network typical of aerogels.

Examples 12-14

TEOS/BTP-B (Aerogels Surface Treated Prior to Gelation)

Hybridized silica aerogels were synthesized using the Aerogel Preparation Procedure, except that the sol was gelled by adding 1.33 grams of HMDZ (mole ratio of TEOS:HMDZ=1:0.33) rather than the 0.05 N NH4OH solution in order to provide hydrophobic aerogels.

TABLE 6

Formulation of TEOS/BTP-B aerogels with a surface treatment.

| | Relative wt. % | | Moles per mole of TEOS | | | | |
|---|---|---|---|---|---|---|---|
| Ex. | TEOS | BTP-B | H$_2$O | THF | EtOH | HCl | HMDZ |
| 12 | 99 | 1 | 3.0 | 3.0 | 2.0 | 0.0008 | 0.33 |
| 13 | 97 | 3 | 3.0 | 2.9 | 2.0 | 0.0008 | 0.33 |
| 14 | 95 | 5 | 3.0 | 2.9 | 2.0 | 0.0007 | 0.33 |

As summarized in Table 7, Examples 12-14 were hydrophobic and had the characteristic properties of aerogels.

TABLE 7

Characterization of TEOS/BTP-B aerogels with a surface treatment.

| Ex. | surface area (m$^2$/g) | pore volume (cc/g) | hydrophobic |
|---|---|---|---|
| 12 | 825 | 2.0 | Yes |
| 13 | 719 | 1.4 | Yes |
| 14 | 605 | 1.4 | Yes |

Comparative Example CE-3 and Examples 15-17

TEOS/BTP-C Aerogels

Hybridized and unhybridized silica aerogels were synthesized using the Aerogel Preparation Procedure.

TABLE 8

Formulation of TEOS/BTP-C aerogels.

| | Relative wt. % | | Moles per mole TEOS | | | |
|---|---|---|---|---|---|---|
| Ex. | TEOS | BTP-C | H$_2$O | THF | HCl | NH$_4$OH |
| CE-3 | 100 | 0 | 1.0 | 1.9 | 0.0007 | 0.0028 |
| 15 | 93 | 7 | 1.0 | 1.9 | 0.0007 | 0.0028 |
| 16 | 87 | 13 | 1.0 | 1.9 | 0.0007 | 0.0028 |
| 17 | 80 | 20 | 1.0 | 1.9 | 0.0007 | 0.0028 |

The aerogels possessed high surface area and pore volume. These samples were not surface treated and were not hydrophobic.

TABLE 9

Characterization of TEOS/BTP-C aerogels without a surface treatment.

| Ex. | surface area (m$^2$/g) | pore volume (cc/g) | hydrophobic |
|---|---|---|---|
| CE-3 | 945 | 5.2 | No |
| 15 | 773 | 2.3 | No |
| 16 | 628 | 2.3 | No |
| 17 | 349 | 1.0 | No |

Comparative Example CE-4 and Examples 18 and 19

TEOS/BTP-C Aerogels Surface Treated Prior to Gelation

Hybridized and unhybridized silica aerogels were synthesized using the Aerogel Preparation Procedure, except that the sol was gelled by adding 1.33 grams of HMDZ (mole ratio of TEOS:HMDZ=1:0.33) rather than the 0.05 N NH4OH solution in order to provide hydrophobic aerogels.

TABLE 10

Formulation of TEOS/BTP-C aerogels with a surface treatment.

| | Relative wt. % | | Moles per mole TEOS | | | | |
|---|---|---|---|---|---|---|---|
| Ex. | TEOS | BTP-C | H$_2$O | THF | EtOH | HCl | HMDZ |
| CE-4 | 100 | 0 | 3.0 | 3.2 | 2.0 | 0.0007 | 0.33 |
| 18 | 95 | 5 | 3.0 | 3.0 | 2.0 | 0.0007 | 0.33 |
| 19 | 90 | 10 | 3.0 | 3.3 | 2.0 | 0.0007 | 0.33 |

As summarized in Table 11, the samples were hydrophobic and possessed the characteristic properties of aerogels such as high surface area and high pore volume. Also, comparing the results shown in Tables 9 and 11, the characteristic aerogel properties are similar for the samples with and without the surface treatment.

TABLE 11

Characterization of TEOS/BTP-C aerogels with a surface treatment.

| Ex. | surface area (m²/g) | pore volume (cc/g) | hydrophobic |
|---|---|---|---|
| CE-4 | 945 | 5.2 | Yes |
| 18 | 773 | 2.3 | Yes |
| 19 | 628 | 2.3 | Yes |

Comparative Example CE-5 and Examples 20 and 21

TEOS/BTP-A Aerogels on a Flexible Substrate without Surface Treatment Prior to Gelation Hybridized and unhybridized silica aerogels were synthesized using the Aerogel Preparation Procedure. For these Samples, a substrate in the form of a bonded fibrous web was used as a flexible structured carrier for the aerogel. The web was made from a 75-25 blend of 3d WELLMAN PET fibers and 6d KOSA PET fibers at 30 grams per square meter (gsm). The fibers were carded, corrugated and bonded to 30 gsm of PP 7C05N strands wherein the corrugating pattern had 10 bonds per 2.54 cm (i.e., 10 bonds per inch). Details regarding the manufacture of such webs can be found in, e.g., U.S. Pat. No. 6,537,935 (Seth) and U.S. Pat. No. 5,888,607 (Seth).

TABLE 12

Formulation of TEOS/BTP-A aerogels on a flexible substrate without surface treatment prior to gelation.

| | Relative wt. % | | Moles per mole of TEOS | | | | |
|---|---|---|---|---|---|---|---|
| Ex. | TEOS | BTP-A | H₂O | THF | EtOH | HCl | NH₄OH |
| CE-5 | 100 | 0 | 3.1 | 3.0 | 2.0 | 0.0007 | 0.0017 |
| 20 | 97 | 3 | 3.0 | 2.9 | 2.1 | 0.0008 | 0.0017 |
| 21 | 95 | 5 | 3.0 | 2.8 | 2.0 | 0.0007 | 0.0017 |

The thermal conductivity of the aerogel/flexible substrate composites was measured at a mean temperature of 12.5° C. using a LASERCOMP Fox200 instrument.

TABLE 13

Thermal conductivity of TEOS/BTP-A aerogels on a flexible substrate without surface treatment prior to gelation.

| Ex. | thickness (mm) | temperature (° C.) | thermal conductivity (mW/m-K) |
|---|---|---|---|
| CE-5 | 1.89 | 12.5 | 24.3 |
| 20 | 1.85 | 12.5 | 26.6 |
| 21 | 1.80 | 12.5 | 22.0 |

Examples 22-25

TEOS/BTP-A Aerogels on a Flexible Substrate with Surface Treatment Prior to Gelation Hybridized silica aerogels were synthesized using the Aerogel Preparation Procedure, except that the sol was gelled by adding 1.33 grams of HMDZ (mole ratio of TEOS:HMDZ=1:0.33) rather than the 0.05 N NH4OH solution in order to provide hydrophobic aerogels. A bonded fibrous web was used as a flexible structured carrier for the aerogel. The compositions of Examples 22-25 are shown in Table 14 and the thermal conductivity of the resulting aerogel/flexible substrate composites are shown in Table 15.

TABLE 14

TEOS/BTP-A aerogels on a flexible substrate with surface treatment.

| | Relative wt. % | | Moles per mole TEOS | | | | |
|---|---|---|---|---|---|---|---|
| Ex. | TEOS | BTP-A | H₂O | THF | EtOH | HCl | HMDZ |
| 22 | 99 | 1 | 3.0 | 3.0 | 2.0 | 0.0007 | 0.165 |
| 23 | 97 | 3 | 3.0 | 2.9 | 2.0 | 0.0007 | 0.33 |
| 24 | 95 | 5 | 3.0 | 2.8 | 2.0 | 0.0007 | 0.165 |
| 25 | 90 | 10 | 3.0 | 2.6 | 2.0 | 0.0007 | 0.33 |

TABLE 15

Thermal conductivity of flexible hybrid aerogel articles.

| Ex. | Thickness (mm) | Temperature (° C.) | thermal conductivity (mW/m-K) |
|---|---|---|---|
| 22 | 1.9 | 12.5 | 27.2 |
| 23 | 1.7 | 12.5 | 27.1 |
| 24 | 1.7 | 12.5 | 27.9 |
| 25 | 2.1 | 12.5 | 32.3 |

Comparative Example 6 and Examples 26-30

TEOS/BTP-A (Aerogels Surface Treated Prior to Gelation)

Qualitatively, the difference between purely inorganic aerogels and the hybrid aerogels containing branched telechelic polymers is readily apparent through finger crushing wherein the hybrid samples are clearly less brittle. However, it can be difficult to generate completely crack-free cylinders in the sizes generally recommended for compressive testing to generate precise quantitative data.

The crush strength of various hybrid aerogels was evaluated qualitatively. Three independent testers attempted to crush a sample of the aerogel with their thumb, and rate the resistance to crushing on a scale of 1 to 5, with 5 being the most resistance to crushing. Variability in aerogel size and shape is expected to contribute the variability in these qualitative test results. In addition, variability in the extent of pre-existing cracks in the aerogel samples tested is expected to affect the results as well. The individual ratings and averages are reported in Table 16.

TABLE 16

Qualitative crush resistance.

| Sample | BTP | wt. % (a) | Test 1 | Test 2 | Test 3 | Avg. |
|---|---|---|---|---|---|---|
| CE-1 | n/a | 0 | 4 | 2 | 4 | 3.3 |
| 1 | BTP-A | 0.5 | 4 | 3 | 3 | 3.3 |
| 2 | BTP-A | 1 | 2 | 1 | 2 | 1.7 |
| 3 | BTP-A | 3 | 3 | 2 | 1 | 2.0 |
| 4 | BTP-A | 5 | 2 | 1 | 5 | 2.7 |
| CE-2 | n/a | 0 | 2 | 3 | 1 | 2.0 |
| 5 | BTP-A | 0.5 | 3 | 1 | — | 2.0 |
| 6 | BTP-A | 3 | 3 | 2 | 3 | 2.7 |

TABLE 16-continued

Qualitative crush resistance.

| Sample | BTP | wt. % (a) | Test 1 | Test 2 | Test 3 | Avg. |
|---|---|---|---|---|---|---|
| 7 | BTP-A | 5 | 2 | 3 | 2 | 2.3 |
| 8 | BTP-A | 10 | 2 | 2 | 4 | 2.7 |
| 9 | BTP-A | 1 | 1 | 1 | 2 | 1.3 |
| 10 | BTP-A | 3 | 3 | 2 | 3 | 2.7 |
| 11 | BTP-A | 5 | 3 | 1 | 1 | 1.7 |
| CE-3 | BTP-C | 0 | 2 | 1 | 1 | 1.3 |
| 15 | BTP-C | 7 | 2 | 1 | 2 | 1.7 |
| 16 | BTP-C | 13 | 4 | 3 | 3 | 3.3 |
| 17 | BTP-C | 20 | 5 | 3 | 4 | 4.0 |

(a) Parts by weight of the branched telechelic polymer per 100 parts of the metal oxide precursor in the sol used to prepare the sample.

An inorganic aerogel (CE-6) and various organic/inorganic hybrid aerogels prepared with branched telechelic polymers (Examples 26 and 27) were prepared using the Aerogel Preparation Procedure according to the compositions summarized in Table 17. In addition, these samples were subjected to the Surface Treatment Process.

TABLE 17

Formulation of TEOS/BTP-A aerogels surface treated prior to gelation.

| | Relative wt. % | | | | | | | |
|---|---|---|---|---|---|---|---|---|
| | | BTP- | Moles per mole TEOS | | | | | |
| Ex. | TEOS | A | $H_2O$ | THF | EtOH | HCl | HMDZ | NH4OH |
| CE-6 | 100 | 0 | 3 | 2 | 3 | 0.0008 | 0.33 | 0 |
| 26 | 99.5 | 0.5 | 3 | 3 | 2 | 0.0007 | 0.33 | 0 |
| 27 | 97 | 3 | 3 | 3 | 2 | 0.0007 | 0.33 | 0 |

Upon visual inspection, these samples appeared relatively crack-free and were tested for compressive modulus using an INSTRON universal tester (Instron Corp. Model 1123, Canton, Mass.) with a 1 kN load cell operated at a crosshead speed of 1 millimeter per minute (mm/min). BLUEHILL 2 software was used in combination with the tester. Aerogel cylinders of known length and diameter were subjected to compressive forces and the load versus compressive extension was recorded.

TABLE 18

Compressive modulus.

| Ex. | % BTP | Height (mm) | Diameter (mm) | Area (mm2) | Compressive Modulus (MPa) |
|---|---|---|---|---|---|
| CE-6 | 0% | 5.01 | 7.58 | 45.1 | 117 |
| 26 | 0.5% | 5.76 | 7.07 | 39.2 | 46 |
| 27 | 3% | 5.39 | 7.35 | 42.4 | 22 |

Various modifications and alterations of this invention will become apparent to those skilled in the art without departing from the scope and spirit of this invention.

What is claimed is:

1. A method of preparing a hybrid aerogel comprising forming an aerogel precursor from a sol comprising a solvent, a metal oxide precursor, and a branched telechelic copolymer; and drying the aerogel precursor to form the hybrid aerogel.

2. The method of claim 1, wherein forming the aerogel precursor comprises co-hydrolyzing and co-condensing the metal oxide precursor and the branched telechelic copolymer.

3. The method according to claim 1, further comprising solvent-exchanging the aerogel precursor with an alkyl alcohol to form an alcogel.

4. The method according to claim 3, further comprising supercritically drying the aerogel precursor or the alcogel to form the hybrid aerogel.

5. The method according to claim 1, wherein the solvent comprises water, optionally wherein the sol comprises at least two moles of water per mole of metal oxide precursor.

6. The method according to claim 1, wherein the solvent comprises an alkyl alcohol.

7. The method according to claim 1, wherein the metal oxide precursor comprises an organosilane selected from the group consisting of (a) tetraethoxysilane, tetramethoxysilane, and combinations thereof; and (b) a polysilicate.

8. The method according to claim 1, wherein the sol comprises at least 0.5% by weight and no greater than 25% by weight the branched telechelic polymer based on the total weight of the metal oxide precursor and the branched telechelic copolymer.

9. The method according to claim 1, wherein the branched telechelic polymer comprises hydrolyzable functional groups.

10. The method according to claim 1, wherein the branched telechelic polymer is the polymerization product of a combination of monomers comprising one or more (meth)acrylate monomers, wherein at least one (meth)acrylate monomer is butyl acrylate.

11. The method according to claim 1, wherein the metal oxide of the aerogel precursor is covalently bonded to the branched telechelic polymer.

12. The method according to claim 1, wherein the sol comprises a hydrophobic surface modifying agent.

13. The method according to claim 1, wherein the sol further comprises an acid, optionally wherein the acid comprises at least one of hydrochloric acid and oxalic acid.

14. The method according to claim 1, further comprising applying the sol to a substrate prior to forming the aerogel.

15. The method of claim 14, wherein the sol is applied to the substrate prior to forming the aerogel precursor.

* * * * *